(12) United States Patent
Li et al.

(10) Patent No.: US 10,564,482 B2
(45) Date of Patent: Feb. 18, 2020

(54) DISPLAY PANEL AND DISPLAY DEVICE

(71) Applicant: BOE TECHNOLOGY GROUP CO., LTD., Beijing (CN)

(72) Inventors: Pan Li, Beijing (CN); Yuxin Zhang, Beijing (CN)

(73) Assignee: BOE TECHNOLOGY GROUP CO., LTD., Beijing (CN)

(*) Notice: Subject to any disclaimer, the term of this patent is extended or adjusted under 35 U.S.C. 154(b) by 15 days.

(21) Appl. No.: 15/529,542

(22) PCT Filed: May 19, 2016

(86) PCT No.: PCT/CN2016/082608
§ 371 (c)(1),
(2) Date: May 25, 2017

(87) PCT Pub. No.: WO2017/161658
PCT Pub. Date: Sep. 28, 2017

(65) Prior Publication Data
US 2018/0196290 A1    Jul. 12, 2018

(30) Foreign Application Priority Data
Mar. 25, 2016 (CN) .................... 2016 2 0240906 U

(51) Int. Cl.
G02F 1/1339    (2006.01)
G02F 1/1333    (2006.01)
G02F 1/135     (2006.01)

(52) U.S. Cl.
CPC ...... *G02F 1/1339* (2013.01); *G02F 1/133308* (2013.01); *G02F 2001/1351* (2013.01)

(58) Field of Classification Search
CPC .. G02F 1/1339; G02F 1/13394; G02F 1/1341; G02F 1/1333; G02F 1/161;
(Continued)

(56) References Cited

U.S. PATENT DOCUMENTS

2004/0183992 A1    9/2004 Lee et al.
2007/0091245 A1*   4/2007 Chang .................. G02F 1/1341
                                              349/153
2017/0038619 A1    2/2017 Fan et al.

FOREIGN PATENT DOCUMENTS

CN    202182997 U    4/2012
CN    103454813 A    12/2013
(Continued)

OTHER PUBLICATIONS

International Search Report for Chinese International Application No. PCT/CN2016/082808 dated Nov. 3, 2016.
(Continued)

*Primary Examiner* — Thoi V Duong
(74) *Attorney, Agent, or Firm* — Calfee, Halter & Griswold LLP

(57) ABSTRACT

The present disclosure provides a display panel and a display device, which can reduce damage to a frame sealant caused by impact of a photoelectric material on the frame sealant during cell-assembling of the display. The display panel includes a first substrate, a second substrate, and a frame sealant and a photoelectric material layer between them; the photoelectric material is in a liquid and flowing status, the photoelectric material layer is located in and covers a display region of the display panel, and the frame sealant is located in a non-display region of the display panel. The display panel further includes a blocking portion provided in the non-display region and at a side of the frame sealant near the display region for blocking the photoelectric material. The blocking portion includes a channel for shunting the photoelectric material so as to block impact of the photoelectric material on the frame sealant.

14 Claims, 7 Drawing Sheets

(58) Field of Classification Search
CPC ............... G02F 1/0107; G02F 2201/50; G02F 2202/28; G02F 2202/023; G02F 1/133308; G02F 2001/13415; G02F 2001/1351; G02G 2001/133388; G02G 2001/13398; G02G 2001/13415; G02G 2001/133354

See application file for complete search history.

(56) References Cited

FOREIGN PATENT DOCUMENTS

| | | |
|---|---|---|
| CN | 104749828 A | 7/2015 |
| CN | 105353568 A | 2/2016 |

OTHER PUBLICATIONS

International Search Report for Chinese International Application No. PCT/CN2016/082608 dated Nov. 30, 2016.

\* cited by examiner

DISPLAY PANEL AND DISPLAY DEVICE

RELATED APPLICATIONS

The present application is the U.S. national phase entry of PCT/CN2016/082608, with an international filing date of May 19, 2016, which claims the benefit of Chinese Patent Application No. 201620240906.5, filed on Mar. 25, 2016, the entire disclosures of which are incorporated herein by reference.

TECHNICAL FIELD

The disclosure relates to the technical field of display, and in particular to a display panel and a display device.

BACKGROUND

With the increasing maturity of display technology, various displays have been developed. For example, a liquid crystal display panel comprises a first substrate, a second substrate and a liquid crystal layer located therebetween. There are two ways of manufacturing a liquid crystal injection at present, one is suck-filling and the other is drop-filling. The suck-filling slowly sucks liquid crystals based on capillary principle after cell-assembling of the first substrate and the second substrate. This way of liquid crystal injection is very time-consuming and wastes liquid crystals, and hence liquid crystal injection by drop-filling is generally used.

SUMMARY

The object of the present disclosure is at least to provide a display panel and a display device to solve the problem of damage to a frame sealant caused by impact of a photoelectric material (e.g. liquid crystals) on the frame sealant during cell-assembling of the display.

To achieve the object, in one aspect of the present disclosure, a display panel is provided, which comprises a first substrate, a second substrate, and a frame sealant and a photoelectric material layer between them; wherein the photoelectric material is in a liquid and flowing status, the photoelectric material layer is located in a display region of the display panel, and the frame sealant is located in a non-display region of the display panel. The display panel further comprises a blocking portion provided in the non-display region and at a side of the frame sealant near the display region for blocking the photoelectric material.

In some implementations, the blocking portion comprises a channel for shunting the photoelectric material.

In some implementations, the blocking portion comprises a plurality of first blocking units.

In some implementations, the first blocking units have a higher density in four corner regions of the display panel than in other regions.

In some implementations, the first blocking units are blocking walls.

In some implementations, the blocking walls have a shape of a straight line, a polyline or a curve.

In some implementations, the first blocking units are spacer arrays.

In some implementations, the spacer arrays have a shape of a parallelogram. A pair of opposite sides of the parallelogram are parallel to a boundary of the display region of the display panel.

In some implementations, the spacer arrays have an irregular shape with two straight-line sides and two curved-line sides. The two straight-line sides are parallel to a boundary of the display region of the display panel.

In some implementations, in a direction from a boundary of the display region to the frame sealant, angles between tangent lines of the curved-line sides of the spacer array and the boundary of the display region decrease gradually.

In some implementations, width L1 of a first blocking unit at a side of a boundary of the display region along an orientation of the boundary and width L2 of a channel between the first blocking unit and an adjacent first blocking unit have a relation of $0.7L1 \leq L2 \leq 1.3L1$.

In some implementations, width L1 of a first blocking unit at a side of a boundary of the display region along an orientation of the boundary and width L2 of a channel between the first blocking unit and an adjacent first blocking unit have a relation of $0.9L1 \leq L2 \leq 1.1L1$.

In some implementations, straight-line shaped blocking walls at a side of a boundary of the display region are inclined relative to the boundary.

In some implementations, an acute angle between straight-line shaped blocking walls at a side of a boundary of the display region and the boundary is between 30°-60°.

In some implementations, another pair of opposite sides of the spacer array arranged as a parallelogram at a side of a boundary of the display region are inclined relative to the boundary.

In some implementations, another pair of opposite sides of the spacer array arranged as a parallelogram are vertical relative to the boundary. In some implementations, an acute angle between the other pair of opposite sides of the spacer array and the boundary is between 30°-60°.

In some implementations, the blocking portion further comprises a plurality of second blocking units uniformly arranged, which are provided at a side of the first blocking units far away from the display region; the second blocking units are blocking walls, and the second blocking units at a side of a boundary of the display region are parallel to the boundary.

In some implementations, the blocking portion further comprises third blocking units, and the third blocking units are spacers that are provided between the blocking walls.

In a second aspect according to the present disclosure, a display device is provided, which comprises the display panel according to the first aspect of the present disclosure.

BRIEF DESCRIPTION OF DRAWINGS

In the present disclosure, like reference numerals generally indicate like components.

DETAILED DESCRIPTION OF EMBODIMENTS

Technical solutions in embodiments of the present disclosure will be described below clearly and completely in connection with the drawings in embodiments of the present disclosure. Obviously, the described embodiments are merely some instead of all of the embodiments of the present disclosure. All other embodiments that can be obtained by those ordinary skilled in the art on the basis of the embodiments in the present disclosure without undue experiments shall fall into the protection scope of the present disclosure.

Unless otherwise specified, technical terms or scientific terms used herein shall have meanings that are commonly appreciated by those skilled in the art. The words "first", "second" and the like used in the specification and claims of the present patent application do not indicate any sequence, quantity or importance, but are merely used for differentiating different components.

Figure 1A:
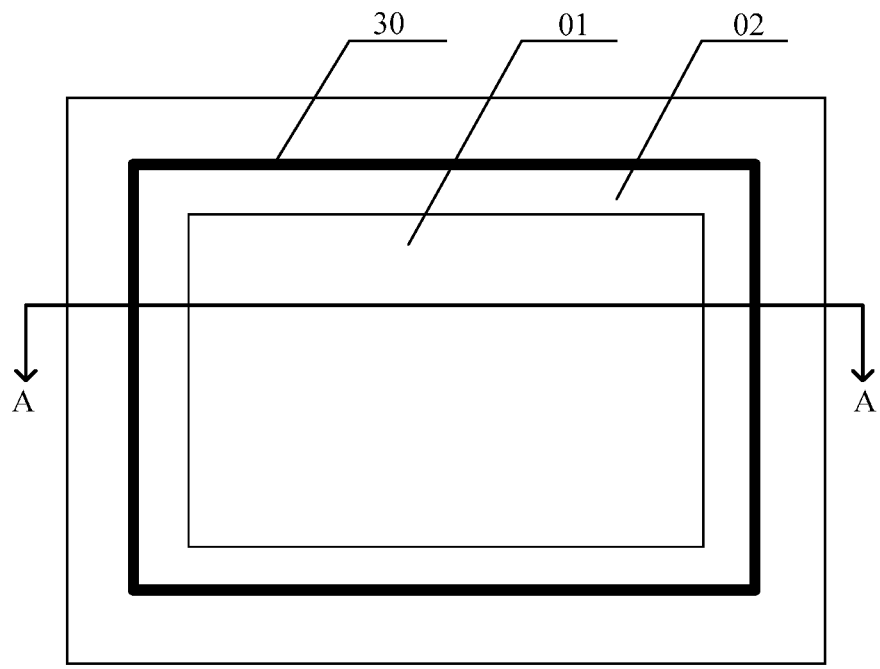
FIG. 1a is a schematic top view of a liquid crystal display panel according to the prior art.
Figure 1B:
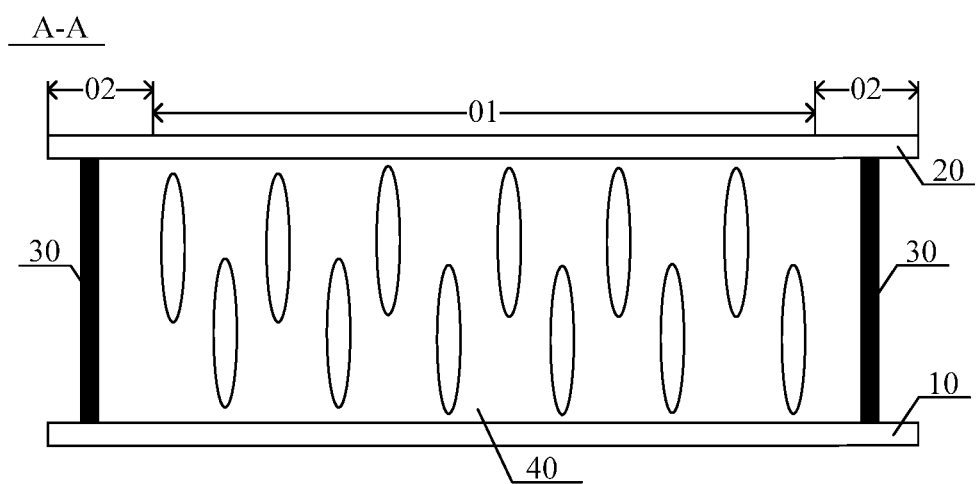
FIG. 1b is a schematic sectional view of the liquid crystal display panel according to FIG. 1a in the direction AA.

As shown in FIGS. 1a and 1b, drop-filling is achieved in a first substrate 10. A frame sealant 30 is provided in a vertical direction surrounding edges of a display region of a first substrate 10 in a non-display region of the first substrate 10, thereby forming walls. Although FIGS. 1a and 1b do not explicitly show the display region and non-display region of the first substrate 10, it should be realized by those skilled in the art shall that the display regions of the first substrate 10 and the display panel correspond to a display region 01 of a second substrate 20, and the non-display regions of the first substrate 10 and the display panel correspond to a non-display region 02 of the second substrate 20. Liquid crystals are drop-filled within the walls formed by the frame sealant 30, to form a liquid crystal layer 40. Then the liquid crystal layer 40 is covered by the second substrate 20 and the frame sealant 30 is cured. When the frame sealant 30 is cured, liquid crystals have been sealed between the two substrates.

The inventor of the present disclosure realized that liquid crystal injection by drop-filling as currently used is problematic. Take FIGS. 1a and 1b as examples, in the process of drop-filling liquid crystals within the walls formed by the frame sealant 30 and then covering the liquid crystals by the second substrate 20, the liquid crystals would have impact on the frame sealant 30, and thus result in damage of the frame sealant 30, such as crack, so that the whole liquid crystal display panel become scrapped.

At least for this problem, the present disclosure provides a display panel and a display device. By providing a blocking portion at a side of the frame sealant near the display region of the substrate in the non-display region of the substrate, a fluid and flowing photoelectric material can be blocked in the process of cell-assembling, thereby reducing and even eliminating damage to the frame sealant caused by impact of the photoelectric material on the frame sealant in the process of cell-assembling, and thus solving the possible problem of scrapping the display panel. Based on this, the blocking portion may further comprise channels. The channels can shunt the photoelectric material during cell-assembling so as to scatter the impact force of the photoelectric material and to slowly release the impact force as the photoelectric material flows along the channels, and thus they can also prevent the blocking portion from being damaged.

Figure 2:
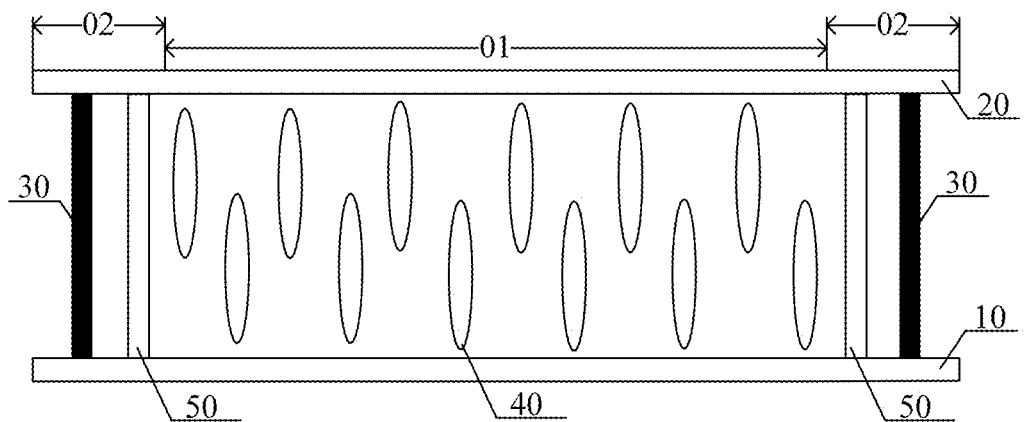
FIG. 2 is a schematic sectional view of a liquid crystal display panel according to an embodiment of the present disclosure.

A display panel according to an embodiment of the present disclosure is provided, as shown in FIG. 2, which comprises a first substrate 10, a second substrate 20, and a frame sealant 30 and a photoelectric material layer 40 between them. A photoelectric material in the photoelectric material layer 40 is in a liquid and flowing status. The photoelectric material layer 40 is located in a display region 01 of the display panel (which corresponds to display regions 01 of the first substrate 10 and the second substrate 20), and the frame sealant 30 is located in a non-display region 02 of the display panel (which corresponds to non-display regions 02 of the first substrate 10 and the second substrate 20). In some embodiments, the display region 01 of the display panel is a rectangle.

Further, the display panel also comprises: a blocking portion 50 provided in the non-display region 02 and at a side of the frame sealant 30 near the display region 01 for blocking the photoelectric material. In some embodiments, the blocking portion 50 may comprise channels (not shown in FIG. 2) for shunting the photoelectric material. In some embodiments, the channels may be holes of various shapes in the blocking portion 50. In some other embodiments, the channels may be gaps between independent first blocking units as described below.

It shall be noted that first, according to the present disclosure, types of the first substrate 10 and the second substrate 20 are not limited, and the first substrate 10 can be an array substrate and the second substrate 20 can be a cell-assembling substrate. In some embodiments, a color film layer may be provided on the cell-assembling substrate, and then the cell-assembling substrate is called a color film substrate. Of course, the color film layer can also be provided on the array substrate.

Of course, in some embodiments, the second substrate 20 can be an array substrate while the first substrate 10 is a cell-assembling substrate, which is not set forth in detail any more.

The frame sealant 30 and the blocking portion 50 can both be formed on the first substrate 10 or the second substrate 20, or they can be formed on the first substrate 10 and the second substrate 20, respectively.

Second, the blocking portion 50 is formed between the first substrate 10 and the second substrate 20 for blocking the photoelectric material so as to prevent the frame sealant 30 from being damaged by the impact force of the photoelectric material during cell-assembling. In some embodiments, the blocking portion 50 thus has the same height as the frame sealant 30 so as to better reduce damage to the frame sealant 30 by the impact force. In some embodiments, the height of the blocking portion 50 may be smaller than the height of the frame sealant 30.

According to the present disclosure, widths of the channels in the blocking portion 50 are not limited, as long as they can enable shunting of the photoelectric material.

In addition, the material and forming way of the blocking portion 50 are not limited. For example, it may be formed by lithography and etching processes or by any other processes. Moreover, the blocking portion 50 can be made of any material suitable for blocking.

Third, according to the present disclosure, arrangement of the blocking portion 50 is not limited. It can be arranged in any way in the non-display region 02 of the display panel as long as it can block the photoelectric material.

Fourth, according to the present disclosure, no limitation is made to the photoelectric material. For example, it may be a liquid crystal or any other kinds of photoelectric materials.

In the display panel according to the present disclosure, by provided the blocking portion 50 at a side of the frame sealant 30 near the display region 01 and in the non-display region 02, the liquid and flowing photoelectric material can be blocked in the process of cell-assembling, thereby reducing damage to the frame sealant 30 caused by impact of the photoelectric material on the frame sealant 30 during cell-assembling, and thus solving the possible problem of scrapping the display panel. Based on this, the blocking portion 50 may further comprise channels 502 as shown in FIGS. 3-11, for example. The channels can shunt the photoelectric material during cell-assembling so as to scatter the impact force of the photoelectric material and to slowly release the impact force as the photoelectric material flows along the channels, and thus they can also prevent the blocking portion 50 from being damaged.

Alternatively, as shown in FIGS. 3-13, the blocking portion 50 comprises a plurality of first blocking units 501.

The first blocking units 501 herein are independent entities, wherein gaps between adjacent first blocking units 501 form the above-mentioned channels 502.

According to the present disclosure, the number of the first blocking units 501 is not limited, but it can be set reasonably in the non-display region 02 according to a distance from the boundary of the display region 01 to the frame sealant 30 and sizes of channels 502 between the first blocking units 501.

In an embodiment of the present disclosure, the first blocking units 501 are arranged in the non-display region 02, and it can block and shunt the impact force of the photoelectric material during cell-assembling, so as to reduce the impact force produced by the photoelectric material to the frame sealant 30 (which passes through the blocking portion 50 and reaches the frame sealant 30), thereby avoiding damage to the frame sealant 30.

Alternatively, the first blocking units 501 have a higher density in the four corner regions of the display panel than in other regions.

In the process of cell-assembling, the four corner regions of the display panel are subjected to most impact forces from the photoelectric material in various directions. Therefore, in order to avoid damage to the frame sealant 30 in the four corner regions of the display panel by the photoelectric material, the first blocking units 501 arranged in the four corner regions of the display panel have a higher density than in other regions. In other regions than the four corner regions, the first blocking units 501 can be uniformly arranged at certain intervals.

In an embodiment of the present disclosure, the first blocking units 501 have a higher density in the four corner regions of the display panel than in other regions. In the four corner regions of the display panel, higher density of the first blocking units 501 can result in more effective blocking and shunting of the impact force from the photoelectric material, thereby avoiding damage to the frame sealant 30 in the four corner regions of the display panel caused by the photoelectric material.

Alternatively, as shown in FIGS. 3-7, FIG. 10 and FIGS. 12-13, the first blocking units 501 are blocking walls.

According to the present disclosure, no limitation is made to the shape and arrangement of the blocking walls 501, as long as the blocking walls 501 can block and shunt the photoelectric material.

Further, the blocking walls 501 have a shape of a straight line, a polyline or a curve.

Figure 3:
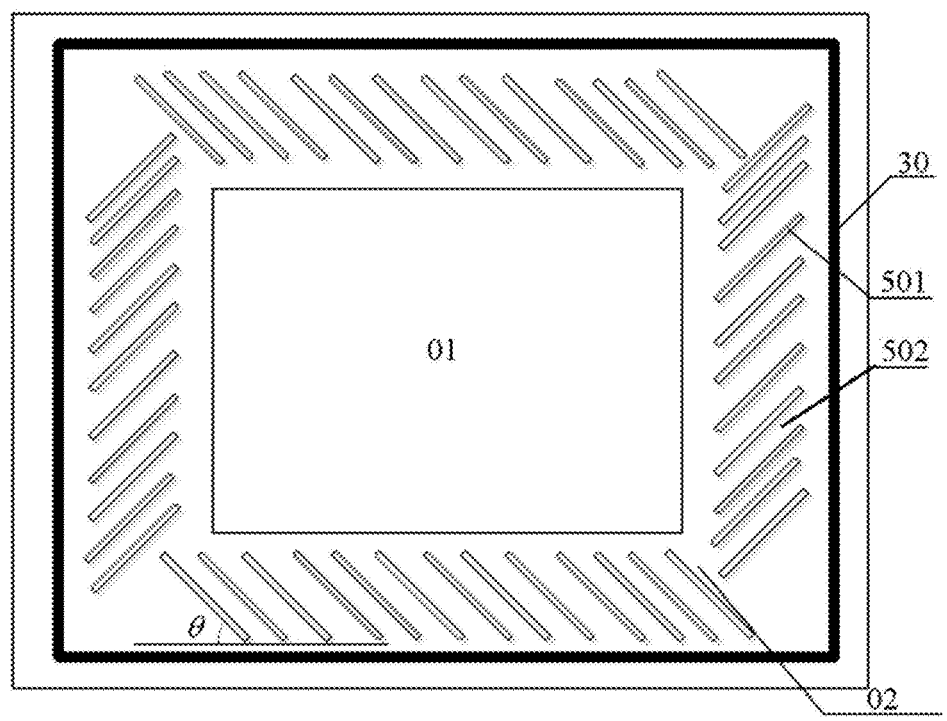
FIG. 3 is a schematic top view of a liquid crystal display panel according to a first embodiment of the present disclosure.
Figure 4:
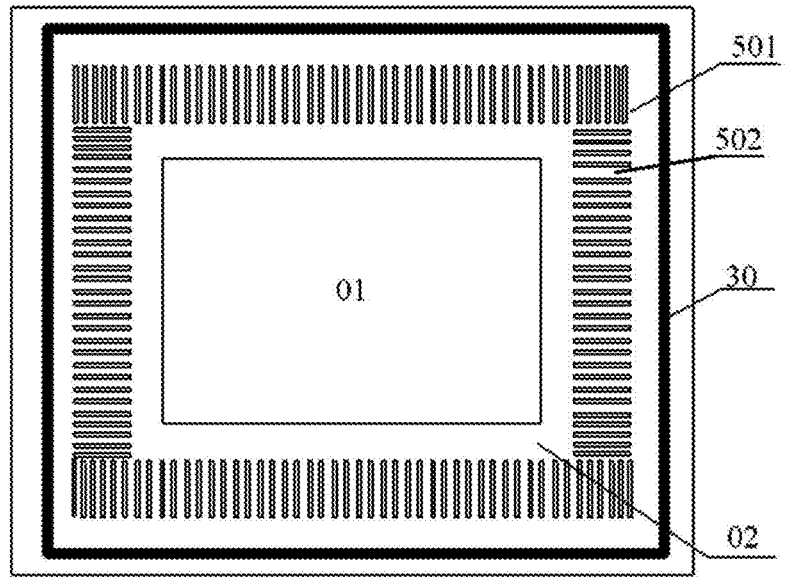
FIG. 4 is a schematic top view of a liquid crystal display panel according to a second embodiment of the present disclosure.
Figure 10:
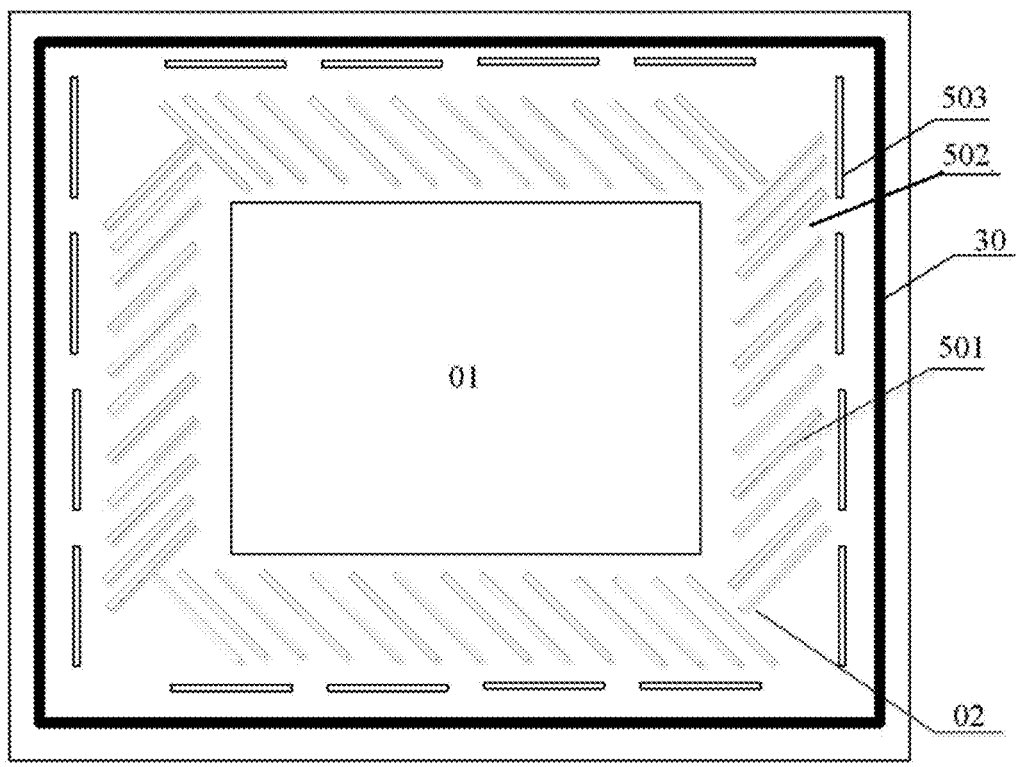
FIG. 10 is a schematic top view of a liquid crystal display panel according to an eighth embodiment of the present disclosure.
Figure 12:
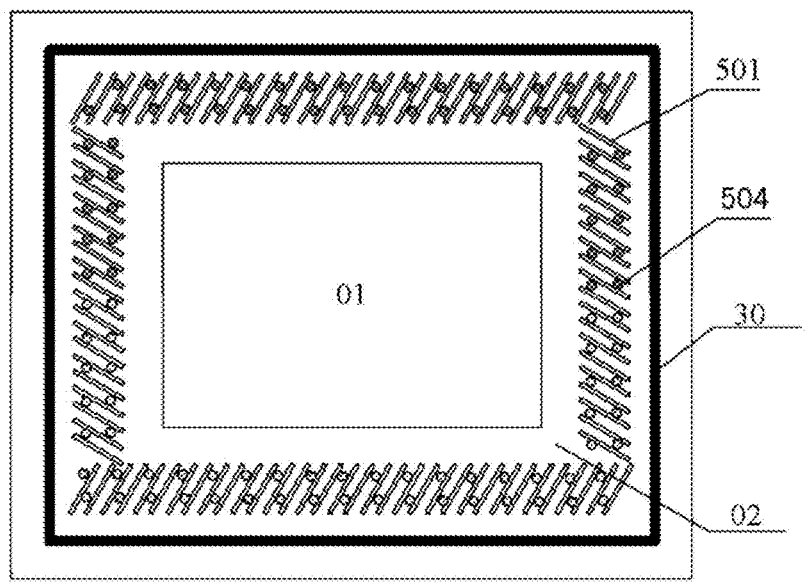
FIG. 12 is a schematic top view of a liquid crystal display panel according to a tenth embodiment of the present disclosure.

Specifically, as shown in FIGS. 3-4, FIG. 10 and FIG. 12, the blocking walls 501 may have a shape of a straight line. In some embodiments, the boundary of the display region 01 is a rectangle, and the blocking walls 501 at a side of a boundary of the display region 01 may be inclined relative to the boundary as shown in FIGS. 3, 10 and 12. In some embodiments, the blocking walls 501 at a side of a boundary of the display region 01 may be vertical relative to the boundary as shown in FIG. 4.

If the blocking walls 501 at a side of a boundary of the display region 01 are vertical relative to the boundary, the number of the blocking walls 501 may be set to be larger, as compared to the case where they are inclined. This is because, if the blocking walls 501 are inclined, the photoelectric material may flow obliquely, which can reduce the impact force to the frame sealant 30, and if the blocking walls 501 are vertical, the photoelectric material has a short path of flowing, and thus compared to the case where the blocking walls 501 are inclined, the frame sealant 30 is subjected to more impact force from the photoelectric material. In this case, by providing more blocking walls 501, more shunt can be made to the photoelectric material so as to reduce the impact force to the frame sealant 30.

Based on this, alternatively, according to an embodiment of the present disclosure, the straight-line shaped blocking walls 501 at a side of a boundary of the display region 01 are inclined relative to the boundary.

Figure 5:
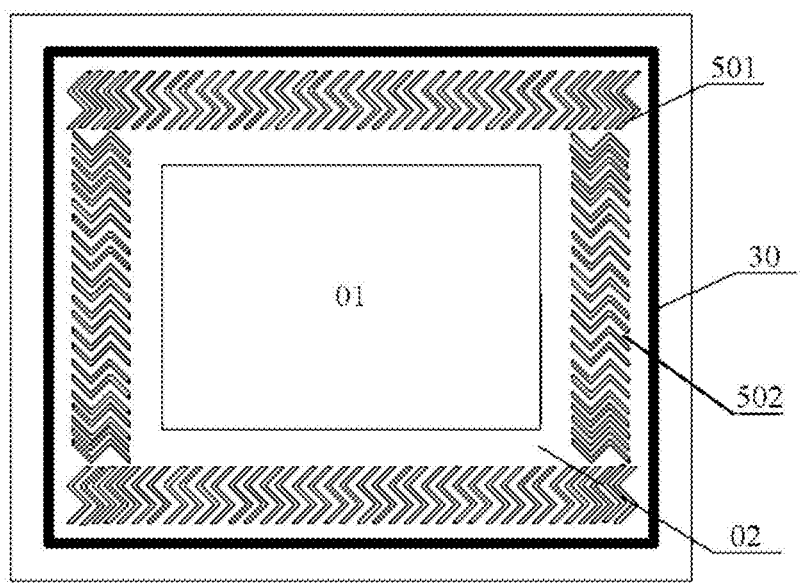
FIG. 5 is a schematic top view of a liquid crystal display panel according to a third embodiment of the present disclosure.
Figure 6:
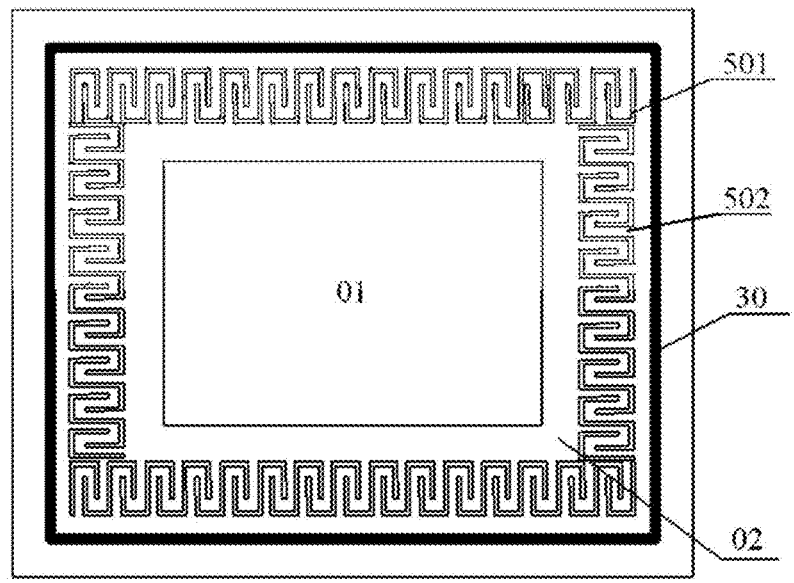
FIG. 6 is a schematic top view of a liquid crystal display panel according to a fourth embodiment of the present disclosure.
Figure 7:
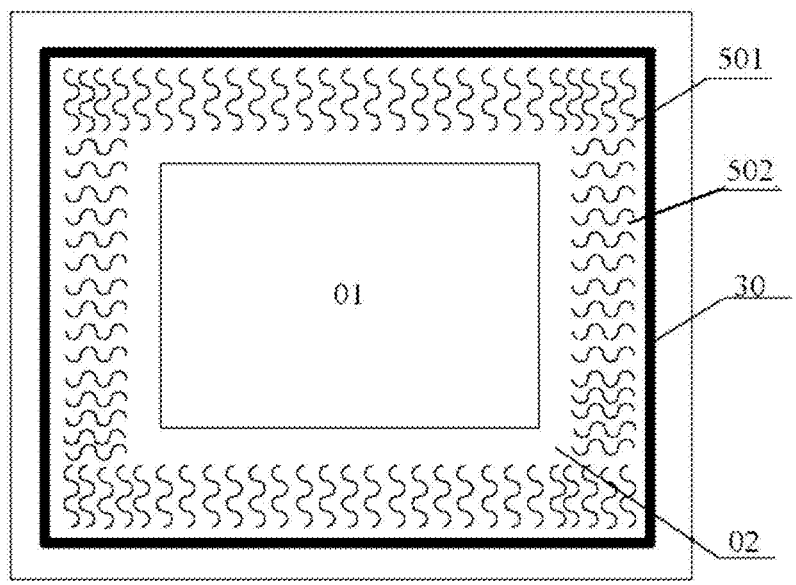
FIG. 7 is a schematic top view of a liquid crystal display panel according to a fifth embodiment of the present disclosure.
Figure 13:
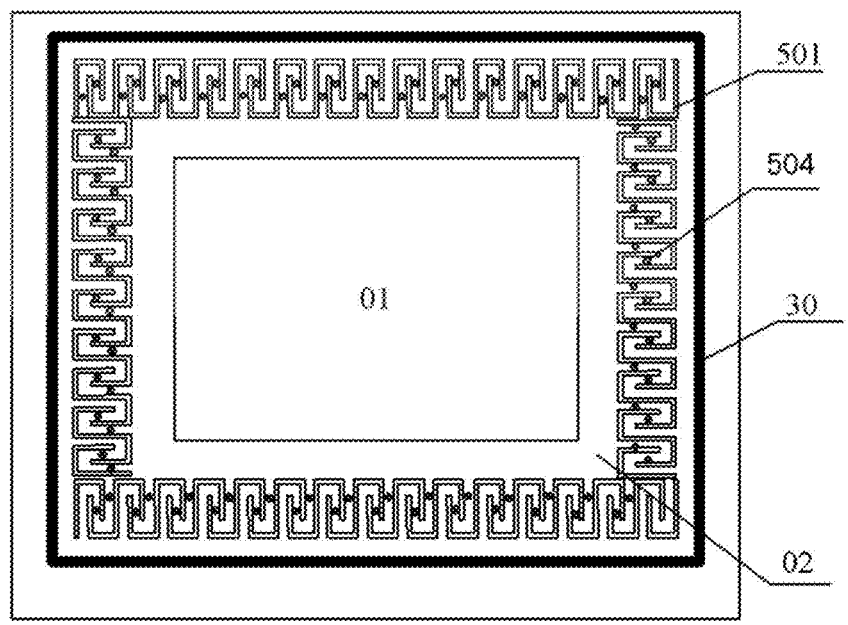
FIG. 13 is a schematic top view of a liquid crystal display panel according to an eleventh embodiment of the present disclosure.

As shown in FIGS. 5-6 and 13, the blocking walls 501 can also have a polyline shape. Or as shown in FIG. 7, the blocking walls 501 can have a curve shape.

According to the present disclosure, the shape of the polyline or the curve is not limited, and thus it can be any polyline or curve.

Figure 8:
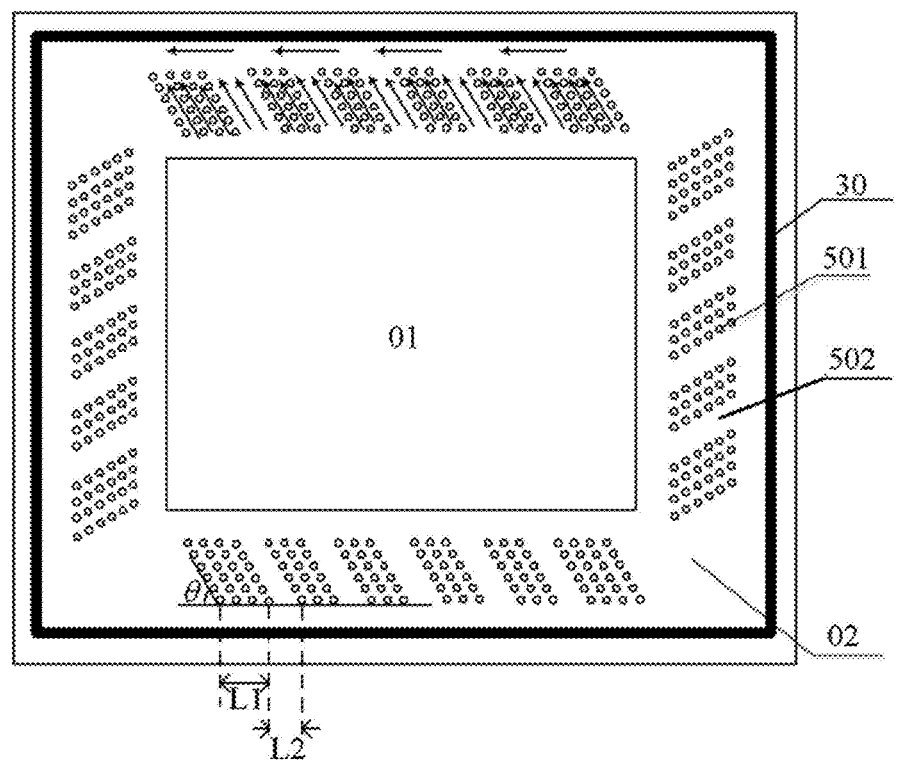
FIG. 8 is a schematic top view of a liquid crystal display panel according to a sixth embodiment of the present disclosure.
Figure 9:
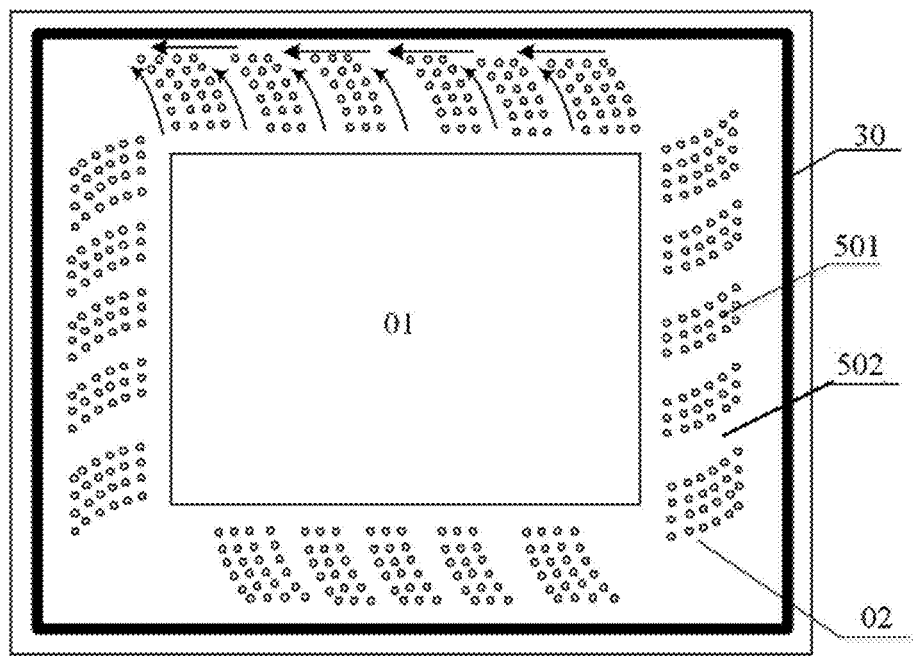
FIG. 9 is a schematic top view of a liquid crystal display panel according to a seventh embodiment of the present disclosure.
Figure 11:
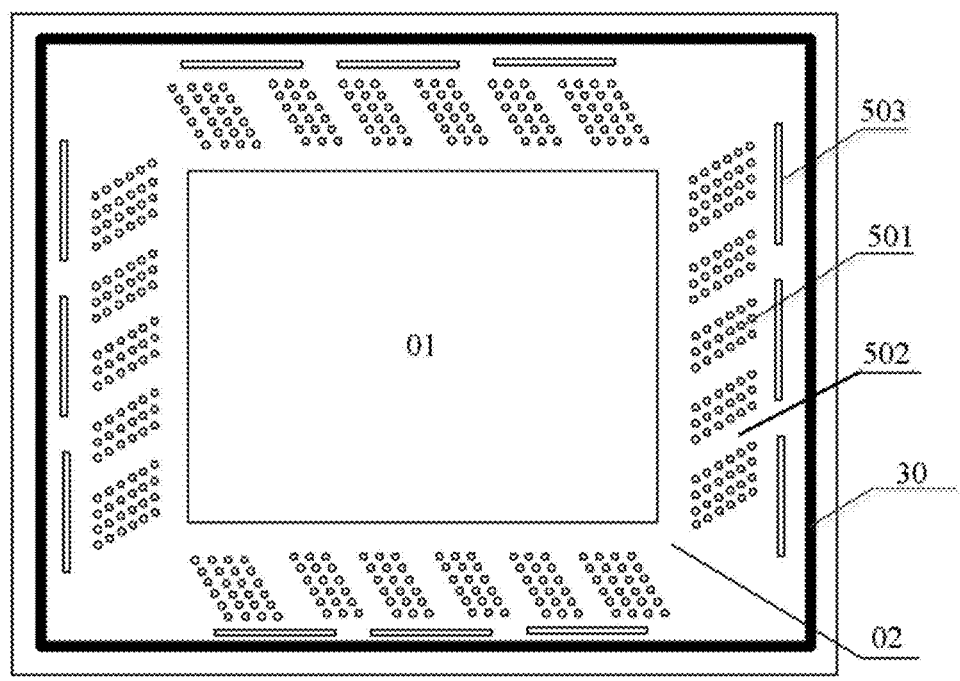
FIG. 11 is a schematic top view of a liquid crystal display panel according to a ninth embodiment of the present disclosure.

In some embodiments, as shown in FIGS. 8, 9 and 11, the first blocking unit 501 can be a spacer array. As shown in FIGS. 8 and 11, the spacer array 501 may have a shape of a parallelogram. A pair of opposite sides of the parallelogram are parallel to a boundary of the display region 01. In some embodiments, the spacer array 501 may be arranged in any other form.

According to the present disclosure, the material of the spacers is not limited in the embodiments of the present disclosure, and it can be a complex mixture. The material of the blocking walls may be the same as the material of the spacers.

In some embodiments, another pair of opposite sides of the spacer array 501 can be vertical to the boundary of the display region 01. In some other embodiments, the spacer array 501 can also be inclined relative to the boundary of the display region 01, as shown in FIGS. 8, 9 and 11. In an embodiment of the present disclosure, alternatively, the other pair of opposite sides of the spacer array 501 are inclined relative to the boundary of the display region 01.

The spacer array 501 is arranged in a shape of a parallelogram wherein one pair of opposite sides of the parallelogram are parallel to a boundary of the display region 01 and the other pair of opposite sides are inclined relative to the boundary of the display region 01. In this case, in the process of cell-assembling, the photoelectric material flows in a direction (shown by the arrows in FIG. 8) inclined relative to the boundary of the display region 01, and more inclined flowing of the photoelectric material is formed between spacer arrays 501 while less inclined flowing of photoelectric material is formed within the spacer array 501. The inclined flowing photoelectric material has smaller impact on the frame sealant 30. Moreover, after passing through the spacer arrays 501, the photoelectrical material changes to flow along orientation of the frame sealant 30 to form a slow circulation around the frame sealant 30 until coming to stop gradually.

Alternatively, as shown in FIG. 9, the spacer array 501 has an irregular shape with two straight-line sides and two curved-line sides. The two straight-line sides are parallel to a boundary of the display region 01.

According to the present disclosure, the bending degree and bending direction of the two curved-line sides are not limited, as long as they can effectively block and shunt the photoelectric material.

When the spacer array 501 is arranged in a shape having two straight-line sides and two curved-line sides, in the process of cell-assembling, the photoelectric material flows along the orientation of the curved-line sides (as shown by the arrows in FIG. 9), which can enable transition of the flowing direction of the photoelectric material to a direction parallel to the frame sealant 30 at a smoother angle, thereby further reducing impact on the frame sealant 30 and consuming the impact force of the photoelectric material in the circulation.

Alternatively, along a direction from the boundary of the display region 01 to the frame sealant 30, acute angles formed by tangent lines of the curved-line side of the spacer array 501 and the boundary of the display region 01 decreases gradually, as shown in FIG. 9.

Larger degree of bending of the curved-line sides of the spacer array 501 means more reduction of the impact force of the photoelectric material. Moreover, the closer to the boundary of the display region 01, the stronger the impact force of the photoelectric material. As the photoelectric material gradually flows from the boundary of the display region 01 to the frame sealant 30, the impact force of the photoelectric material will gradually decrease. In order to prevent the spacer array 501 from being damaged by the strong impact force of the photoelectric material close to the boundary of the display region 01, a portion of the curved-line side of the spacer array 501 near the boundary of the display region 01 may have a small degree of bending, i.e., an angle formed by a tangent line of the curved-line side of the spacer array 501 and the boundary of the display region 01 is large. Since the impact force of the photoelectric material decreases gradually along a direction from the boundary of the display region 01 to the frame sealant 30, the effect of blocking of the spacer array 501 to the impact force of the photoelectric material can be gradually enhanced. Accordingly, angles formed by tangent lines of the curved-line side of the spacer array 501 and the boundary of the display region 01 can be set to decrease gradually.

It shall be noted that in the case where the blocking walls or another pair of opposite sides of the spacer array arranged in a parallelogram are inclined to the boundary of the display region, the present disclosure does not limit the angle of inclination, and it can be any angle as long as the photoelectric material can obliquely flow and the impact force to the frame sealant 30 can be reduced.

If a first blocking unit 501 is a spacer array, alternatively, as shown in FIG. 8, width L1 of the first blocking unit 501 at a side of a boundary of the display region 01 along an orientation of the boundary and width L2 of a channel (a gap) between the first blocking unit 501 and an adjacent first blocking unit 501 have a relation of 0.7L1≤L2≤1.3L1.

The width L1 of the first blocking unit 501 and the width L2 of the channel between the first blocking unit and an adjacent first blocking unit 501 have a relation of 0.7L1≤L2≤1.3L1 herein. As such, in the process of cell-assembling, a relative balance can be achieved between the impact of the photoelectric material to the first blocking unit 501 and the shunting effect. The impact of the photoelectric material can be effectively blocked without damaging the first blocking unit 501, and meanwhile, the photoelectric material can be shunted, thereby reducing the impact force from the photoelectric material to the frame sealant 30. When a relation between the width L1 of the first blocking unit 501 and the width L2 of the channel between the first blocking unit 501 and the adjacent first blocking unit 501 meets 0.9L1≤L2≤1.1L1, blocking and shunting of the photoelectric material by the first blocking unit are perfectly balanced.

When the straight-line shaped blocking walls at a side of a boundary of the display region 01 or another pair of opposite sides of the spacer array arranged as a parallelogram are inclined relative to the boundary, further alternatively, as shown in FIGS. 3 and 8, acute angle θ between the first blocking units 501 at a side of a boundary of the display region 01 and the boundary may be between 30°-60°.

When the angle θ is set between 30°-60°, the impact of the photoelectric material on the first blocking units 501 and the shunting effect are relatively balanced, that is, blocking of the photoelectric material by the first blocking units 501 will not cause the first blocking units 501 themselves to be damaged, and the photoelectric material can be shunted well at the same time, thus facilitating blocking the impact force from the photoelectric material to the frame sealant 30. When the angle θ is set between 45°-50°, blocking and shunting of the photoelectric material by the first blocking units 501 can be perfectly balanced, and thus it is more beneficial to block the impact force from the photoelectric material to the frame sealant 30.

When the straight-line shaped blocking walls at a side of a boundary of the display region 01 or another pair of opposite sides of the spacer array arranged as a parallelogram are inclined relative to the boundary, alternatively, as shown in FIGS. 10 and 11, the blocking portion 50 further comprises a plurality of second blocking units 503 uniformly arranged, which are disposed at a side of the first blocking units 501 far away from the display region 01. As shown in FIGS. 10 and 11, the second blocking units 503 are blocking walls, and the second blocking units 503 at a side of a boundary of the display region 01 are parallel to the boundary.

According to the present disclosure, lengths of the second blocking units 503 and spacing between adjacent second blocking units 503 are not limited, but they can be set according to the type and arrangement of the first blocking units 501 as long as the photoelectric material can be further blocked.

In an embodiment of the present disclosure, the second blocking units 503 at a side of a boundary of the display region 01 are arranged parallel to the boundary. Thus after the photoelectric material flows through the first blocking units 501, the second blocking units 503 further block the photoelectric material flowing to the frame sealant 30, thereby reducing impact on the frame sealant 30 more effectively.

When the first blocking units 501 are blocking walls, alternatively, as shown in FIGS. 12 and 13, the blocking portion 50 further comprises third blocking units 504. The third blocking units 504 are spacers and are arranged between the blocking walls 501.

According to the present disclosure, the number of the third blocking units 504 is not limited as long as they are evenly arranged between the blocking walls.

It shall be noted that the blocking walls are not limited herein, and they can be any of the above-mentioned blocking walls, and the blocking walls are not limited to the straight-line shaped blocking walls 501 as shown in FIG. 12 or the polyline-shaped blocking walls 501 as shown in FIG. 13.

In the embodiments of the present disclosure, the spacers 504 and the blocking walls 501 are arranged in the same region of the non-display region 02. Compared to separately arranging the spacers 504 and the blocking walls 501 in the non-display region 02, this can reduce a space occupied on the non-display region 02, and thus realize side narrowing of the display panel of a photoelectric material.

The blocking walls in the embodiments of the present disclosure may also be set as other shapes, and any open design that can meet reducing of the flow speed of the photoelectric material or extending of the flow path of the photoelectric material shall fall into the protection scope of the present disclosure.

An embodiment of the present disclosure further provides a display device comprising the above-mentioned display panel.

The display device can specifically be any product or component having a display function, such as a liquid crystal display, an organic electroluminescent diode display, a cell phone and a tablet computer.

The above described are only specific embodiments of the present disclosure, and the protection scope of the present disclosure is not limited so. Any variation or substitution that is easily conceivable by those skilled in the art within the technical scope disclosed by the present disclosure shall fall into the protection scope of the present disclosure. Thus the protection scope of the present disclosure is defined by the protection scope of the appended claims.

LIST OF REFERENCE NUMERALS

01 display region
02 non-display region
10 first substrate
20 second substrate
30 frame sealant
40 liquid crystal layer
50 blocking portion
501 first blocking unit
502 channel
503 second blocking unit
504 third blocking unit

The invention claimed is:

1. A display panel comprising: a first substrate, a second substrate, and a frame sealant and a photoelectric material layer between them; wherein the photoelectric material is in a liquid and flowing status, the photoelectric material layer is located in and covers a display region of the display panel, and the frame sealant is located in a non-display region of the display panel;
    wherein the display panel further comprises: a blocking portion provided in the non-display region and at a side of the frame sealant near the display region for blocking the photoelectric material;
    wherein the blocking portion comprises a plurality of independent first blocking units;
    wherein the first blocking units are spacer arrays;
    wherein width L1 of a first blocking unit at a side of a boundary of the display region along an orientation of the boundary and width L2 of a channel between the first blocking unit and an adjacent first blocking unit have a relation of $0.7L1 \leq L2 \leq 1.3\ L1$.

2. The display panel according to claim 1, wherein the blocking portion comprises a channel for shunting the photoelectric material.

3. The display panel according to claim 1, wherein the spacer arrays have a shape of a parallelogram; and wherein a pair of opposite sides of the parallelogram are parallel to a boundary of the display region of the display panel.

4. The display panel according to claim 3, wherein another pair of opposite sides of the spacer array arranged as a parallelogram at a side of a boundary of the display region are inclined relative to the boundary.

5. The display panel according to claim 4, wherein the other pair of the opposite sides of the spacer array arranged as a parallelogram are vertical relative to the boundary.

6. The display panel according to claim 4, wherein an acute angle between the other pair of the opposite sides of the spacer array and the boundary is between 30°-60°.

7. The display panel according to claim 1, wherein the spacer arrays have an irregular shape with two straight-line sides and two curved-line sides; and wherein the two straight-line sides are parallel to a boundary of the display region of the display panel.

8. The display panel according to claim 7, wherein in a direction from the boundary of the display region to the frame sealant, angles between tangent lines of the curved-line sides of the spacer array and the boundary of the display region decrease gradually.

9. The display panel according to claim 1, wherein width L1 of a first blocking unit at a side of a boundary of the display region along an orientation of the boundary and width L2 of a channel between the first blocking unit and an adjacent first blocking unit have a relation of $0.9L1 \leq L2 \leq 1.1L1$.

10. The display panel according to claim 1, wherein the blocking portion further comprises a plurality of second blocking units uniformly arranged, which are provided at a side of the first blocking units far away from the display region; and
    the second blocking units are blocking walls, and the second blocking units at the side of a boundary of the display region are parallel to the boundary.

11. A display device comprising the display panel according to claim 1.

12. A display panel comprising: a first substrate, a second substrate, and a frame sealant and a photoelectric material layer between them; wherein the photoelectric material is in a liquid and flowing status, the photoelectric material layer is located in and covers a display region of the display panel, and the frame sealant is located in a non-display region of the display panel;

wherein the display panel further comprises: a blocking portion provided in the non-display region and at a side of the frame sealant near the display region for blocking the photoelectric material;

wherein the blocking portion comprises a plurality of independent first blocking units;

wherein the first blocking units are blocking walls;

wherein straight-line shaped blocking walls at a side of a boundary of the display region are inclined relative to the boundary;

wherein an acute angle between the straight-line shaped blocking walls at the side of the boundary of the display region and the boundary is between 30°-60°;

wherein the blocking portion further comprises third blocking units; and each of the third blocking units is a spacer and is provided between any two adjacent blocking walls arranged on the same side.

13. The display panel according to claim 12, wherein the blocking portion comprises a channel for shunting the photoelectric material.

14. A display device comprising the display panel according to claim 12.

* * * * *